2,991,405
TRANSISTORIZED MOTOR CONTROL SYSTEM RESPONSIVE TO TEMPERATURE

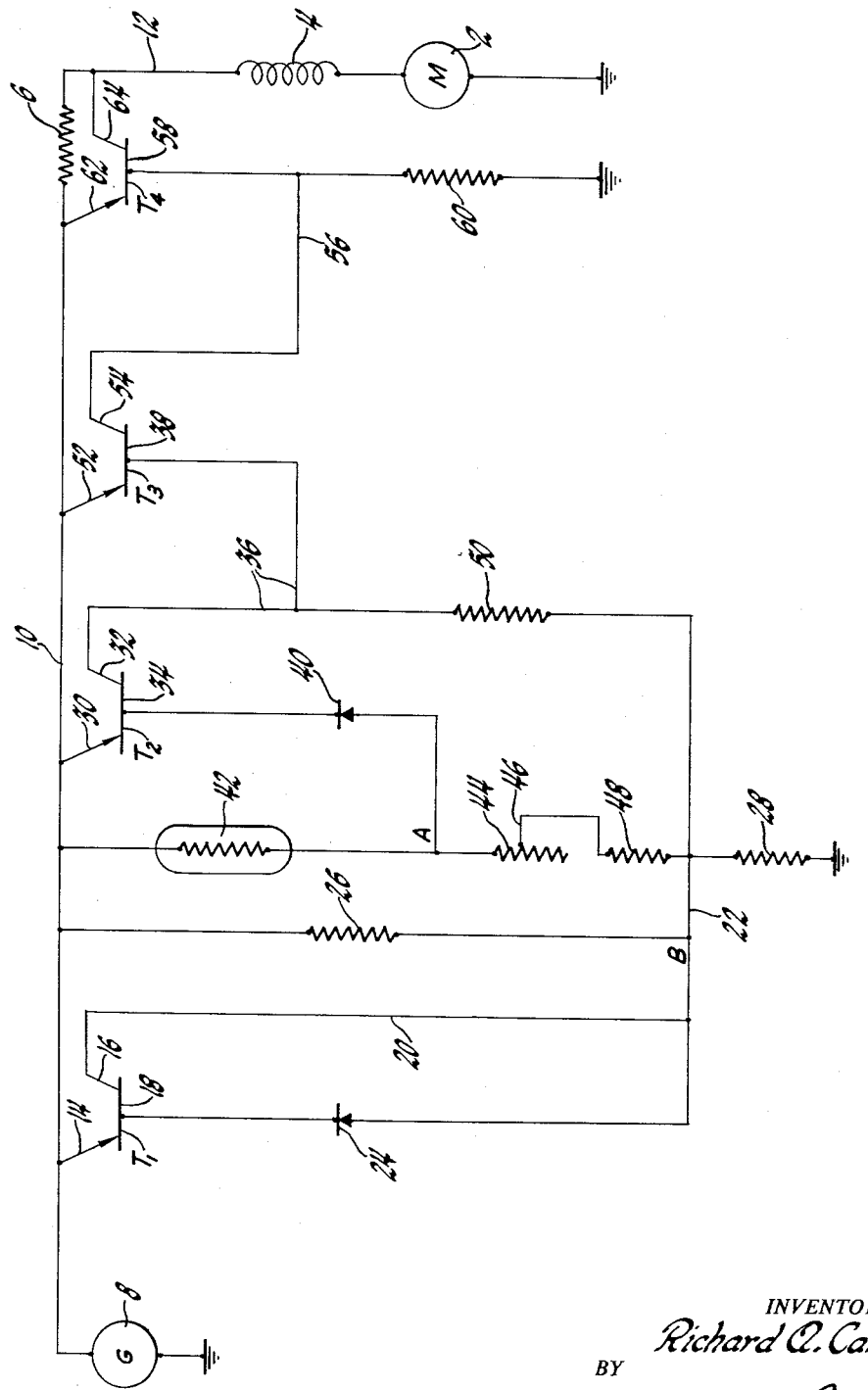

Richard A. Carlson, Clarkston, Mich., assignor to General Motors Corporation, Detroit, Mich., a corporation of Delaware
Filed Feb. 19, 1960, Ser. No. 9,937
5 Claims. (Cl. 318—471)

This invention relates to a temperature sensitive transistorized motor control circuit, said motor being adapted to operate heating means for circulating heated fluid through a radiator for heating an enclosure.

One major source of heat in a motor vehicle is the fluid used for cooling the engine. Heater coils connected to the cooling system of the engine so that the heated water of the same can be circulated therethrough for heating the car interiors are common. However, up to the present the control systems for maintaining the temperature in a vehicle substantially constant from such a source have left much to be desired and a wide fluctuation in temperature occurs between "off" and "on" cycles.

The amount of heat obtainable from a radiator with heated fluid flowing therethrough is determined by two factors (1) heat input to the radiator, and (2) heat radiation or output from the radiator. The first of these, heat input is determined in turn by the amount of fluid circulated through the radiator and the temperature of the fluid so circulated. Once an engine has reached its operating temperature, the temperature of the cooling fluid in the closed system remains approximately the same so the only variable obtainable would be the circulation of more or less fluid through the radiator. The heat output from such a radiator again is determined by the temperature of the radiator and how fast the temperature or heat thereof can be removed, for example by blowing air over the surface. A single motor can be used to circulate hot fluid through the radiator and to blow air thereover or separate motors may be used for these functions, if desired. The motor shown as the supply motor in the present case can be for either both or only one purpose.

It is, therefore, an object in making this invention to provide a simple transistorized heat sensitive system for controlling a heater motor.

It is a further object in making this invention to provide a temperature sensitive control system for a heater motor that has no moving parts and is operable from a variable voltage source.

With these and other objects in view which will become apparent as the specification proceeds, my invention will be best understood by reference to the following specification and claims and the illustrations in the accompanying drawing, in which:

The figure is a circuit diagram of a heat sensitive motor control system embodying my invention.

Referring now to the drawing, there is shown therein a series motor for driving the heater although my system may be used with a shunt type motor if desired. This motor includes an armature 2 and field winding 4 which are connected in series with each other and also in a larger series circuit with a limiting resistor 6 and a source of electric power supply 8 which might be a vehicle generator. The generator 8 has one terminal grounded and the other connected through conductor 10 to one terminal of the resistor 6. The remaining terminal of the resistor 6 is connected to line 12 running to field winding 4 which is in series with armature 2, the opposite side of which is grounded. The value of resistor 6 is such that with no shunt current path available there will be just insufficient current flowing through this circuit to cause the motor to run.

The remainder of the control circuit consists of four transistorized stages $T_1$, $T_2$, $T_3$, and $T_4$. $T_1$ and its associated circuitry constitutes a voltage regulating stage to apply a substantially constant voltage to portions of the remaining remaining circuit from a fluctuating voltage supplied from a source which may be the vehicle generator. $T_2$ and its circuit may be defined as the temperature sensing stage since it includes the temperature sensitive element. The third stage, including transistor $T_3$, is purely an amplifying stage and $T_4$ and its circuitry may be defined as the control stage for the motor.

Since the generator in an automotive vehicle fluctuates widely in speed on car operation its output voltage also is quite variable and it is necessary to utilize some voltage regulation in order to apply a substantially constant voltage to the control system. Transistor $T_1$ has an emitter electrode 14, a collector electrode 16 and a base electrode 18. The emitter electrode 14 is connected directly to power supply line 10, the collector electrode 16 is connected through conductor 20 to a tie line 22 and base electrode 18 is connected to one terminal of a diode 24. This diode is of the well known Zener type. A voltage divider circuit comprising resistances 26 and 28 are connected in series between the power supply line 10 and ground. The conductor 22 is connected to a point intermediate the two resistors 26 and 28 and also to one side of the diode 24. This portion constitutes the voltage regulating section and applies a stable voltage across the sensing section. As the voltage across the line 10 to point B tends to vary due to variation in the total voltage applied across the power line to ground, the flow through the Zener diode 24 which is in parallel with resistance 26 will vary the base bias on transistor $T_1$ which will have a tendency to act in a corrective direction to the voltage change and thus tend to neutralize the same, regulating the voltage across line 10.

The second section or temperature sensing section includes transistor $T_2$. This transistor has an emitter electrode 30, a collector electrode 32 and a base electrode 34. The emitter electrode 30 is connected directly to the power line 10. The collector electrode 32 is connected directly through conductor 36 to the base electrode 38 of the amplifying stage $T_3$ and the base electrode 34 is connected to one side of a Zener diode 40. Connected serially across the regulated power supply between the power line and line 22 is a thermistor 42 which is the temperature sensing unit, a resistance 44 having an adjustable tap 46 movable thereover for varying the amount of resistance in circuit and a resistance 48, the remote terminal of the latter being connected to line 22. The Zener diode 40 has its remaining terminal connected to a point intermediate the thermistor 42 and resistor 44. A biasing resistor 50 is connected between lines 36 and 22. As the temperature in the enclosure in which the thermistor 42 is mounted varies, its resistance varies to change the bias across transistor $T_2$ and this varies the current flow therethrough. The adjustment of tap 46 on resistance 44, of course, determines the temperature at which the enclosure will be maintained.

The amplifying stage $T_3$ has its base 38 connected to the output of the transistor $T_2$ as before mentioned, its emitter 52 being connected directly to the power line 10 and its collector 54 connected through line 56 directly to the base 58 of the control transistor $T_4$. A biasing resistor 60 is connected between base 58 and ground. The emitter 62 of the final transistor $T_4$ is connected directly to power line 10 and the collector 64 to line 12. In this manner the conductive path through transistor $T_4$ is in shunt with the resistor 6 in the main power line to the motor. The thermistor 42 is of the type that as the ambient temperature increases its resistance decreases and more curent therefore is allowed to flow therethrough as the temperature rises.

Let it be assumed first that the temperature within the vehicle in which the thermistor is mounted is too low and that the thermistor therefore calls for heat. Under these conditions the voltage at point A will be relatively low, transistor $T_2$ will be conducting, transistor $T_3$ will be cut off, transistor $T_4$ will be conducting and the motor will be running. As the temperature of the vehicle increases the resistance of the thermistor 42 will decrease causing less voltage drop across the thermistor, raising the voltage at point A to decrease the bias on transistor $T_2$ tending to cut it off. Because of the use of a Zener diode 40, small voltage variations in the Zener voltage region will provide a large change in current in the base circuit of the transistor and a very sensitive control of the current flow in transistor $T_2$ toward cut off. The reduction in current of transistor $T_2$ will increase the voltage bias on the base of transistor $T_3$ and that transistor will now start to conduct which conduction will decrease the voltage bias on the base of transistor $T_4$ causing a reduction of current flow through that transistor reducing the flow of current to the motor and it will slow down and thus eventualy stop if the temperature reaches a high enough point. The control of transistor $T_4$ is a gradual tendency to reduce by small increments as the temperature varies which gives an excellent control for small modulations in temperature. Of course, a reduction in temperature within the vehicle body would cause the opposite result, i.e. that of causing more current to be applied to the motor which then can circulate more heated fluid and/or more air, as the case may be.

What is claimed is:

1. In a control circuit for an electric motor, a source of electric power, a resistance connected in series circuit with said source of electric power and said electric motor of such value that insufficient current will flow through the motor to run the same, electronic amplifying means having a conductive path therethrough and a control electrode connected in the circuit so that its conductive path is in shunt with the resistance and temperature sensitive means whose resistance changes with temperature connected to the source of electrical power and the control electrode of the electronic amplifying means to vary the bias on the electronic amplifying means with variations in ambient temperature to change the flow of current through said shunt path provided by the electronic amplifying means and therefore the speed of the motor.

2. In a control circuit for an electric motor, a source of electric power, a resistance connected in series circuit with said source of electric power and said electric motor of such value that insufficient curent will flow through the motor to run the same, electronic amplifying means having a conductive path therethrough and a control electrode connected in the circuit so that its conductive path is in shunt with the resistance, a temperature sensitive resistance whose value changes with ambient temperature, a second electronic amplifying means having an input and an output circuit, said temperature sensitive resistance and said source of electric power being connected to said input circuit and said control electrode of said first-mentioned electronic amplifying means connected to the output circuit of the second electronic amplifying means so that changes in ambient temperature cause changes in current flow through the second electronic amplifying means which in turn changes the bias on the first-mentioned electronic amplifying means and a change in the speed of the motor.

3. In a control circuit for an electric motor, a source of electric power, a resistance connected in series circuit with said source of electric power and said electric motor of such value that insufficient current will flow through the motor to run the same, electronic amplifying means having a conductive path therethrough and a control electrode connected in the circuit so that its conductive path is in shunt wtih the resistance, temperature sensitive resistance whose value changes with ambient temperature, a second electronic amplifying means having an input and an output circuit, said temperature sensitive resistance and said source of electric power being connected to said input circuit, a Zener diode connected in series in the input circuit to provide a rapid change in current flow with voltage change at a desired voltage level, said control electrode of said first-mentioned electronic amplifying means being connected to the output circuit of the second electronic amplifying means so that changes in temperature will change the input bias on the second electronic amplifying means to vary the current flow therethrough and the bias on the first-named electronic amplifying means to finally control motor speed.

4. In a control circuit for an electric motor, a source of electrical power, a resistor, said resistor, electric motor and source of electrical power being connected in series relation and said resistor having such value as to limit the current flow through the motor so that it will not run, a transistor having an input and an output circuit, said output circuit being connected in shunt to the resistor to control current to the motor, a second transistor having an input and an output circuit, a thermistor connected to the source of electrical power and to the input circuit of the second transistor to vary the bias thereon with temperature variation, a Zener diode designed to provide a large variation in current flow with voltage change at a desired voltage load connected in series in said input circuit of the second transistor, said output circuit of the second transistor being connected to the input circuit of the first thermistor so that small changes in temperature of the thermistor create large changes in current flow through said second transistor to change the bias on said first transistor and modulate the speed of the motor.

5. In a control circuit for an electric motor, a source of electrical power, a resistor, said resistor, electric motor and source of electrical power being connected in series relation and said resistor having such value as to limit the current flow through the motor so that it will not run, a transistor having an input and an output circuit, said output circuit being connected in shunt to the resistor to control current to the motor, a second transistor having an input and an output circuit, a thermistor connected to the source of electrical power and to the input circuit of the second transistor to vary the bias thereon with temperature variation, a Zener diode designed to provide a large variation in current flow with voltage change at a desired voltage connected in series in said input circuit of the second transistor, said output circuit of the second transistor being connected to the input circuit of the first transistor so that small changes in temperature of the thermistor create large changes in current flow through said second transistor to change the bias on said first transistor and modulate the speed of the motor, and voltage regulating means connected to the source of electrical power and to the input circuit to the second transistor to stabilize the supply voltage applied thereto.

No references cited.